United States Patent Office.

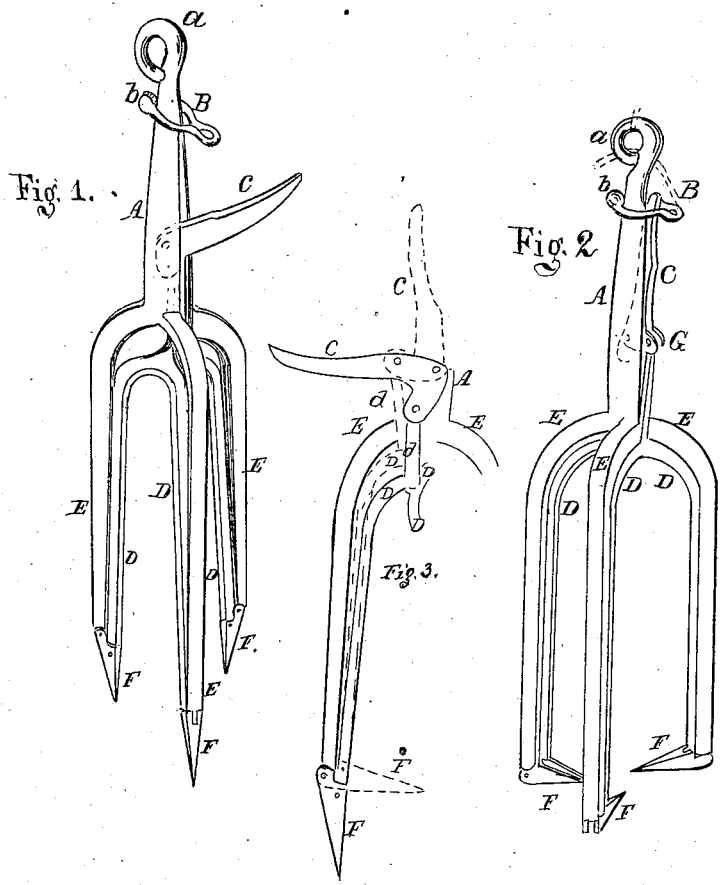

JOHN W. ROW, OF LEWISBURG, PENNSYLVANIA.

Letters Patent No. 93,750, dated August 17, 1869.

IMPROVEMENT IN HORSE HAY-FORKS.

The Schedule referred to in these Letters Patent and making part of the same.

*To all whom it may concern:*

Be it known that I, JOHN W. ROW, of Lewisburg, in the State of Pennsylvania, have invented a new and improved Mode of Constructing a Three-Pronged Implement for Elevating Hay; and I do hereby declare that the following is a full and exact description thereof, reference being had to the accompanying drawings, making a part of this specification, in which—

Figure 1 is a view of the implement, with the points or fingers extended in a line with the legs or arms; and Figure 2, with the fingers drawn in toward a common centre.

Figure 3 illustrates the action of the lever.

The nature of my invention consists in providing an implement for grasping and elevating hay or the like, when dry or short, in such a manner as to penetrate the same, vertically, at three points, in the form of an equilateral triangle, and that, when so inserted, by simply raising the lever-arm, the three points turn up to a horizontal position, with their points directed to a common centre, thus to secure its efficiency and compactness, combined with strength and durability.

To enable others skilled in the art to make and use my invention, a brief explanation of the drawings will suffice, as the several parts and their combination are clearly shown.

The upper portion or stem A is forged out and bent into a ring, a, or its equivalent, for the attachment of a hoisting-rope.

This stem has a deep slot down on one side, for the reception of a lever, C, moving on a pivot-pin through the stem.

This lever C has a slotted foot, G, to which the stem of the interior tripod D D D is fastened by a pivot.

The stem or handle A has three arms, E E E, connected to it, in a triangular position, being curved out, and extending down any desired length or distance apart, in the manner shown.

The stem d, of the inner tripod, is enclosed or slides in the slot, and is connected to the elbowed lever C, the three legs or arms D coming in close contact with the outer arms E below. Both arms are connected by pivots with the finger F, in slots, and shouldered hinge-like.

The operation is illustrated by the red and black lines of fig. 3, by the action of the elbowed lever C.

When the lever is drawn down, the fingers are extended, and ready for plunging into the hay; and, by raising the lever in the slotted head, the fingers are drawn up and hold firmly to the hay.

The lever is locked by simply pulling the ring B over the end. This ring is passed through an eye or staple, b, and has a loop or eye for a dislodging-rope, which, being carried through the ring a to the hand of the operator by a simple pull, will release the lever-arm, and the weight of the hay will straighten the fingers, and allow it to be dislodged in place.

I am aware that various devices are patented, in which one or two fingers are operated by sundry arrangements of levers and trippers, in great variety, more or less efficient; but I am not aware of any horse hay-hook or elevator which is arranged into a double-tripod fashion, operated by a simple elbowed lever, and confined or released by a ring and loop, as here shown and described.

I do not claim the fingers, arms, or slotted stem, separately considered, for such are known in a diversity of forms.

What I claim as my invention, and desire to secure by Letters Patent, is—

The arrangement of the double-tripod arms D E, with their respective stems, in combination with the lever C, and fingers F, and ring-catch B, all operated and combined substantially in the manner and for the purpose specified.

JOHN W. ROW.

Witnesses:
R. W. LAIRD,
R. F. BROWN.